(12) United States Patent
Burcar et al.

(10) Patent No.: US 11,614,007 B1
(45) Date of Patent: Mar. 28, 2023

(54) SINGLE-VALVE ELECTROHYDRAULIC CONTROL SYSTEM FOR ENGINE BRAKING ROCKER ARM CONTROL

(71) Applicant: Caterpillar Inc., Peoria, IL (US)

(72) Inventors: Quinton Burcar, Peoria, IL (US); Mike Dean Roley, Washington, IL (US); Kevin Lloyd Dea, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/673,392

(22) Filed: Feb. 16, 2022

(51) Int. Cl.
*F01L 13/06* (2006.01)
*F01L 1/18* (2006.01)

(52) U.S. Cl.
CPC .............. *F01L 13/06* (2013.01); *F01L 1/181* (2013.01); *F01L 2820/042* (2013.01)

(58) Field of Classification Search
CPC ...... F01L 1/181; F01L 13/06; F01L 2820/042
USPC ................... 123/90.39, 90.4, 90.44
See application file for complete search history.

(56) References Cited

U.S. PATENT DOCUMENTS

| | | | |
|---|---|---|---|
| 6,253,730 B1 | 7/2001 | Gustafson | |
| 6,394,067 B1 | 5/2002 | Usko et al. | |
| 10,550,740 B2 | 2/2020 | Yang et al. | |
| 10,830,159 B2 | 11/2020 | Toth et al. | |
| 2020/0088073 A1 | 3/2020 | Baltrucki et al. | |
| 2020/0141335 A1 | 5/2020 | Groth et al. | |
| 2021/0102480 A1 | 4/2021 | VanDeusen | |

FOREIGN PATENT DOCUMENTS

| | | | | |
|---|---|---|---|---|
| WO | WO-2016207348 A1 | * | 12/2016 | ................ F01L 1/18 |
| WO | WO-2021122046 A1 | * | 6/2021 | .............. F01L 1/181 |

* cited by examiner

*Primary Examiner* — Jorge L Leon, Jr.
(74) *Attorney, Agent, or Firm* — Brannon Sowers & Cracraft PC

(57) ABSTRACT

An engine valve actuation system includes engine braking rocker arms each having a hydraulically actuated switch, and an electrohydraulic control system including an actuation fluid supply, an electrically actuated valve adjustable to vary a pressure of actuation fluid supplied from the actuation fluid supply to the hydraulically actuated switches, and an engine braking control unit. The engine braking control unit is structured to command adjusting the electrically actuated valve to adjust the hydraulically actuated switch in each of the engine braking rocker arms at a switching window timing that is varied from engine braking cycle to engine braking cycle to distribute hard handoffs among the engine braking rocker arms.

16 Claims, 3 Drawing Sheets

SINGLE-VALVE ELECTROHYDRAULIC CONTROL SYSTEM FOR ENGINE BRAKING ROCKER ARM CONTROL

TECHNICAL FIELD

The present disclosure relates generally to engine braking, and more particularly to operating engine braking rocker arms using a single valve in an electrohydraulic control system.

BACKGROUND

Modern internal combustion engines commonly include sophisticated apparatus for actuating engine valves, including a rotatable camshaft coupled with rocker arms for opening and closing intake valves and exhaust valves for each combustion cylinder. Rotation of a camshaft engages cam lobes with rocker arms, or pushrods coupled to rocker arms, to open and close the intake valves and exhaust valves at desired timings to execute an engine cycle. Some engines are also equipped with mechanisms for performing so-called engine braking. Engine braking exploits motion of pistons in the cylinders to compress fluids during an exhaust stroke rather than merely expelling the fluids from the combustion cylinder. In this general manner the engine is caused to perform additional work which can retard the engine, reducing wear on service brakes, improving control, and potentially having other advantages. One known engine braking system employs dedicated engine braking rocker arms which can be selectively activated while exhaust valve rocker arms are deactivated to vary the timing of valve opening and closing events of an exhaust valve to brake the engine.

Typical engine braking systems can be fairly complex. Dedicated engine braking rocker arms can add significant expense and packaging challenges, and the apparatus for controlling engine braking can itself require numerous actuators, valves, and control hardware. Other issues associated with known engine braking systems can include excessive or unequal wear on various components. U.S. patent application Ser. No. 17/126,753, filed Dec. 9, 2020, to Roozenboom et al. is directed to a hydro-mechanical module for engine valve actuation and sets forth one strategy enabling conventional, four-cycle engine operation that can be switched to engine braking operation.

SUMMARY

In one aspect, an engine valve actuation system for an engine includes a plurality of engine braking rocker arms each including a hydraulically actuated switch adjustable between an on state and an off state, and an electrohydraulic control system. The electrohydraulic control system includes an actuation fluid supply, an electrically actuated valve adjustable to vary a pressure of actuation fluid supplied from the actuation fluid supply to each of the hydraulically actuated switches, and an engine braking control unit. The engine braking control unit is structured to receive an engine timing signal indicative of a switching window timing for one of the plurality of engine braking rocker arms, to command adjusting the electrically actuated valve based on the engine timing signal, and to adjust the hydraulically actuated switch in each of the plurality of engine braking rocker arms between the on state and the off state at the switching window timing based on the commanded adjustment to the electrically actuated valve.

In another aspect, a method of operating an engine valve actuation system includes receiving an engine timing signal indicative of a switching window timing for one of a plurality of engine braking rocker arms in an engine, and turning off each of a plurality of exhaust valve rocker arms in the engine at the switching window timing. The method further includes adjusting an electrically actuated valve to vary a pressure of actuation fluid supplied to hydraulically actuated switches of each of the plurality of engine braking rocker arms, and turning on each of the plurality of engine braking rocker arms at the switching window timing based on the adjustment to the electrically actuated valve.

In still another aspect, a control system for engine braking in an engine includes an engine braking control unit structured to receive a timing signal indicative of an engine timing in an engine system having a plurality of exhaust valve rocker arms, a plurality of engine braking rocker arms, and an electrically actuated valve adjustable to vary a pressure of actuation fluid supplied to hydraulically actuated switches in each of the plurality of engine braking rocker arms. The engine braking control unit is further structured to command adjusting the electrically actuated valve based on the engine timing signal to simultaneously adjust each of the hydraulically actuated switches between an on state and an off state. The engine braking control unit is further structured to vary a timing of a plurality of the commanded adjustments to the electrically actuated valve, such that the hydraulically actuated switches are simultaneously adjusted between the on state and the off state at a plurality of different switching window timings to distribute hard handoffs among the plurality of engine braking rocker arms.

DETAILED DESCRIPTION

Figure 1:
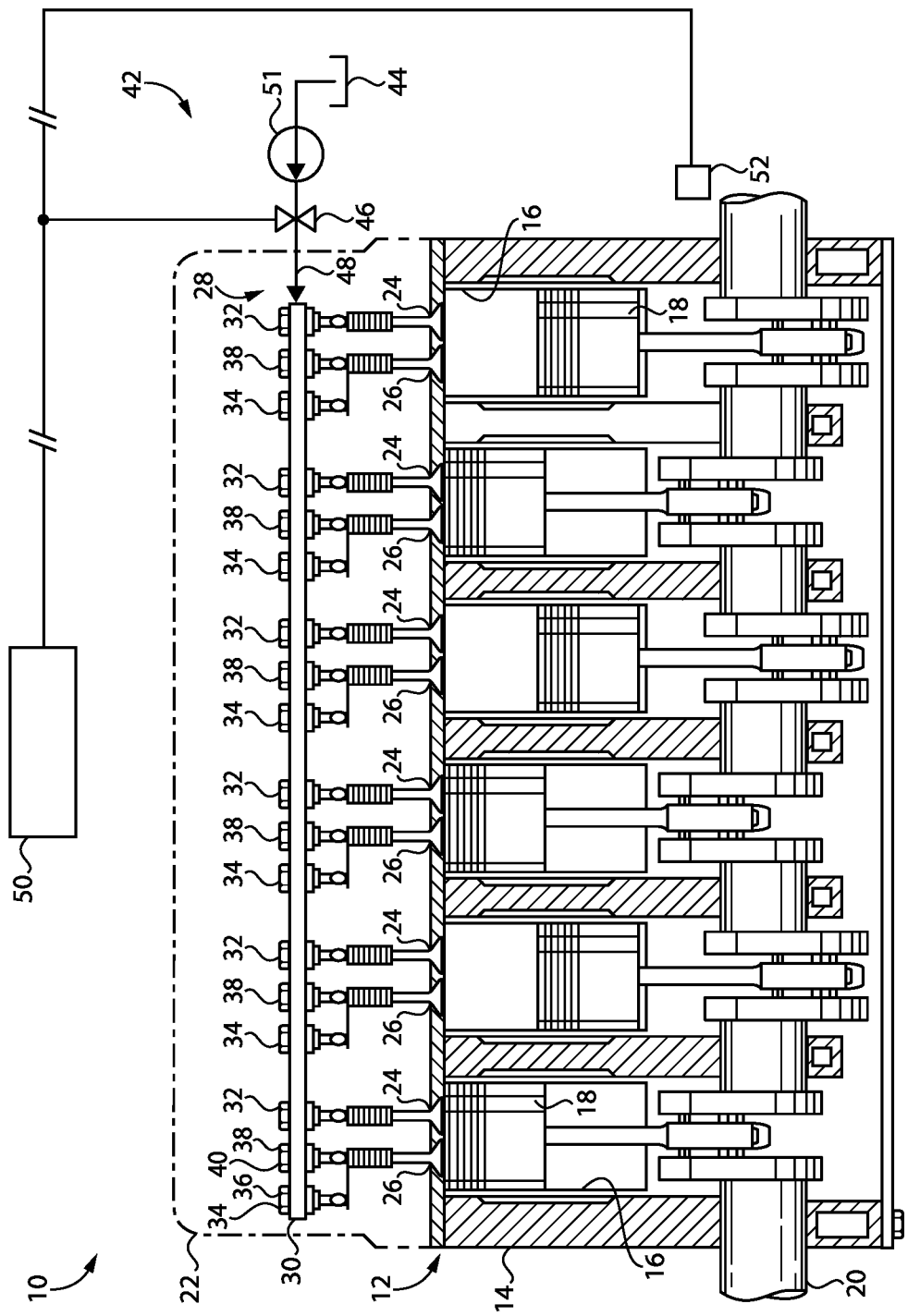
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 with a plurality of combustion cylinders 16 formed therein. A plurality of pistons 18 are movable within cylinders 16 to rotate a crankshaft 20 in a generally conventional manner. Engine system 10 can include a direct-injected compression-ignition diesel engine in some embodiments, although the present disclosure is not thereby limited and spark-ignited configurations are contemplated herein. Engine system 10 could be used to propel a mobile machine such as an on-highway truck or a variety of off-highway machines, for example. Engine 12 may be operated in a conventional four-cycle pattern, and as further discussed herein operated in a compression-release engine braking mode.

An engine head 22 is attached to engine housing 14. A plurality of intake valves 24 and a plurality of exhaust valves 26 are supported in engine head 22 and movable to open and close fluid communications between each cylinder 16 and an intake conduit and an exhaust conduit (neither shown) in a generally conventional manner. Fuel injectors (not shown) may also be supported in engine head 22 so as to extend partially into cylinders 16. In other embodiments engine 12 could be port-injected with a liquid or a gaseous fuel or operated by fumigated delivery of a gaseous fuel, for instance. Dual liquid and gaseous fuel engine systems are also within the scope of the present disclosure.

Engine system 10 further includes an engine valve actuation system 28 having a rotatable camshaft 30. Camshaft 30 will typically rotate at one-half engine speed, or one rotation for every two rotations of crankshaft 20. A conventional engine geartrain may couple camshaft 30 to crankshaft 20. In the illustrated embodiment camshaft 30 is shown in an overhead arrangement. In other embodiments an underhead camshaft could be used. Engine valve actuation system 28 further includes a plurality of intake valve rocker arms 32 operable by way of cam lobes on camshaft 30 to actuate intake valves 24. Actuation system 28 further includes a plurality of exhaust valve rocker arms 38 analogously operated by cam lobes on camshaft 30. Actuation system 28 further includes a plurality of engine braking rocker arms 34 also operated by way of cam lobes on camshaft 30 and each including a hydraulically actuated switch 36 adjustable between an on state and an off state. Each of exhaust valve rocker arms 38 may also include a hydraulically actuated switch 40 adjustable between an on state and an off state. By selectively turning on and turning off engine braking rocker arms 34 and exhaust valve rocker arms 38 engine system 10 can transition between normal operation and engine braking operation.

To this end, engine system 10 and actuation system 28 further includes an electrohydraulic control system 42 having an actuation fluid supply 44, a fluid pump 51, a fluid conduit 48, and an electrically actuated valve 46. Pump 51 may include an engine oil pump and fluid supply 44 may include or be connected to an engine main oil gallery. In other embodiments, an oil or other hydraulic fluid supply separated from the engine main oil gallery might be used. Electrically actuated valve 46 may be solenoid-operated and is adjustable to vary a pressure of actuation fluid supplied from fluid supply 44 to each of hydraulically actuated switches 36 in engine braking rocker arms 34. Valve 46 may also be adjustable to vary a pressure of actuation fluid supplied from fluid supply 44 to each of hydraulically actuated switches 40 in exhaust valve rocker arms 38.

In an implementation valve 46 is a single valve movable, for example, between a first position at which actuation fluid flows through conduit 48 to all of hydraulically actuated switches 36 and 40, and a second position at which actuation fluid does not flow to the respective switches 36 and 40. In a typical configuration providing actuation fluid pressure will simultaneously adjust hydraulically actuated switches 36 to the on state and adjust hydraulically actuated switches 40 to the off state. In other embodiments the respective switches 36 and 40 could be controlled independently, such as by a first valve dedicated to switches 36 and a second valve dedicated to switches 40, or some other arrangement. As will be further apparent from the following description the single-valve configuration disclosed and described is expected to provide advantages respecting cost, packaging, and reduced complexity over designs where separate individual valves each dedicated to one rocker arm or some other design might be used. Electrohydraulic control system 42 further includes an engine braking control unit 50. Engine braking control unit 50 may include a programmable logic controller, such as a microprocessor or microcontroller, and a computer readable memory such as RAM, ROM, SDRAM, DRAM, FLASH, or any other suitable volatile or non-volatile memory, storing program control instructions which, when executed by the programmable logic controller, cause valve actuation system 28 to perform operations of the present disclosure. Other features and functionality of engine braking controller 50 are further discussed herein.

Figure 2:
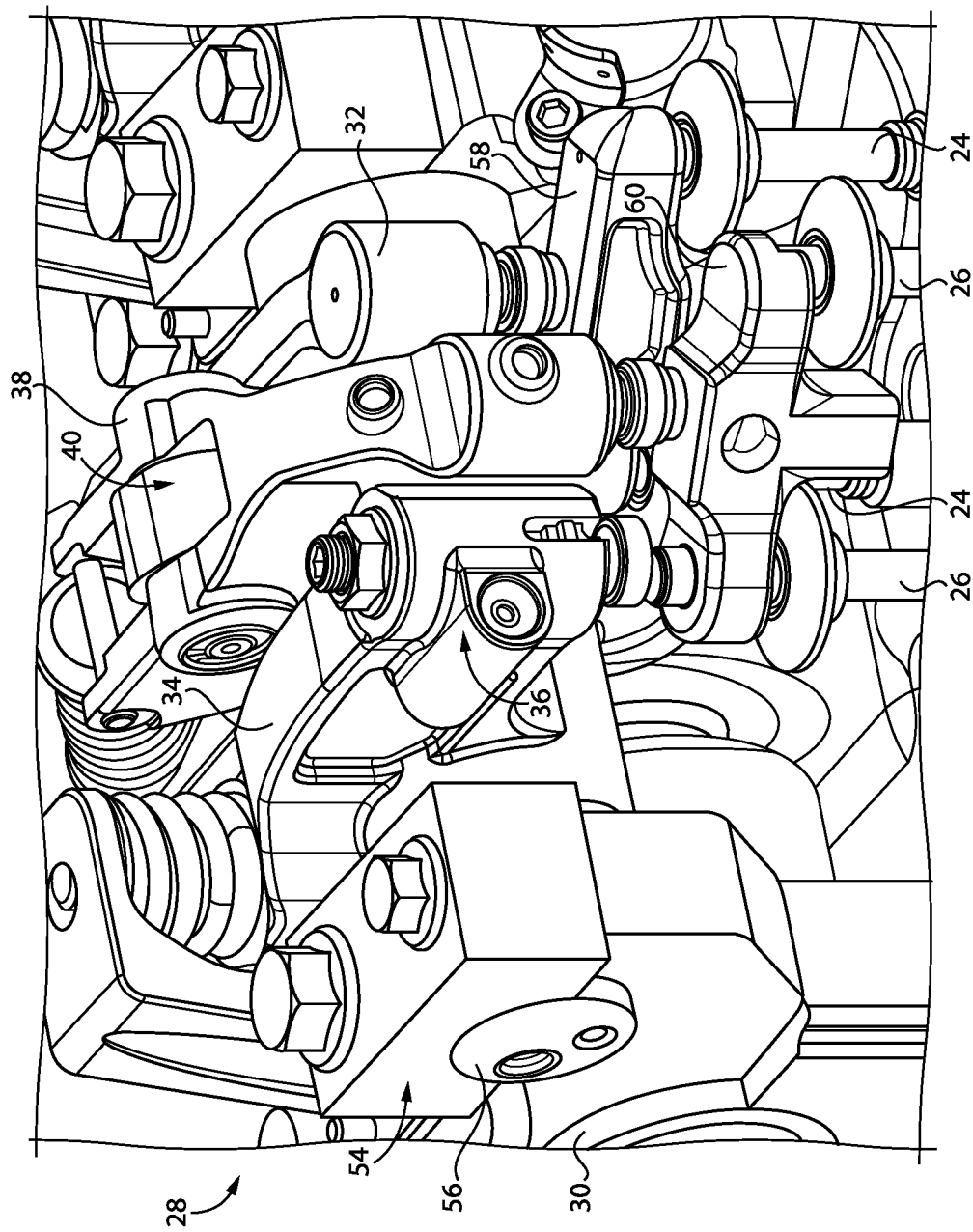
FIG. 2 is a diagrammatic view of an engine valve actuation system, according to one embodiment.

Referring also now to FIG. 2, there are shown features of actuation system 28 in further detail. As can be seen from FIG. 2 an intake valve rocker arm 32 is coupled with a valve bridge 58, in turn coupled to two intake valves 24 for one cylinder. An exhaust valve rocker arm 38 is positioned adjacent to intake valve rocker arm 32, and an engine braking rocker arm 34 is positioned also adjacent to exhaust valve rocker arm 38 upon a side opposite to intake valve rocker arm 32. Each of exhaust valve rocker arm 38 and engine braking rocker arm 34 is coupled with a valve bridge 60 in turn coupled with two exhaust valves 26. Intake valve rocker arm 32, exhaust valve rocker arm 38, and engine braking rocker arm 34 may be packaged together and supported upon a pivot pin 56 pivotable in a pivot stand 54. Thus, an assembly for each cylinder 16 in engine 12 can include similar or identical components to those shown in FIG. 2.

During normal operation exhaust valve rocker arm 38 will reciprocate to actuate valve bridge 60 to open and close exhaust valves 26, and engine braking rocker arm 34 may reciprocate passively such that it does not act on valve bridge 60. During engine braking operation, exhaust valve rocker arm 38 is deactivated (turned off) and engine braking rocker arm 34 is activated (turned on), such that engine braking rocker arm 34 acts on valve bridge 60 and exhaust valve rocker arm 38 does not. Those skilled in the art will appreciate that the opening and closing timings of exhaust valves 26 will differ when controlled by exhaust valve rocker arm 38 versus engine braking rocker arm 34. The construction and arrangement of intake valve rocker arm 32, exhaust valve rocker arm 38, and engine braking rocker arm 34, including the operation of hydraulically actuated switch 36 and hydraulically actuated switch 40 is generally known and not discussed further herein.

It has been observed that when switching between normal operation, where exhaust valve actuation is controlled by exhaust valve rocker arms 38, and engine braking operation, where exhaust valve actuation is controlled by engine braking rocker arms 34, a phenomenon understood as a "hard handoff" can occur. It will be appreciated that pistons 18 are out of phase with one another at any given time during an engine cycle. The cam lobes may be descending, ascending, at a lobe peak, or between lobes, such as on a cam base circle, relative to the rocker arm each controls. Certain angular orientations between a cam lobe and rocker arm, more particularly between a cam lobe and a cam follower of a rocker arm, can result in relatively more or less loading, scuffing, or other phenomena at the interface between the respective components when the rocker arm is switched on or off.

Put differently, each rocker arm and cam lobe combination can respond differently to engine braking being turned on or turned off, depending upon the cam phasing when the switching on or switching off occurs. Compounding this complexity, the states of an engine braking rocker arm and cam lobe and an exhaust valve rocker arm and cam lobe each configured to act on the same exhaust valve(s) can affect the response of either or both to being turned on or turned off. Thus, "handing off" control from an exhaust valve rocker arm to an engine braking rocker arm, or vice versa, can subject one or both of the rocker arms, the cam lobes, or other components to undesired stress, strain, wear, or other phenomena, depending upon exactly when that handing off occurs in an engine cycle. As noted above, since the valve actuation components of each cylinder may be in different states relative to one another at any given time, each time engine braking is turned on or turned off the valve actuation components for one cylinder might experience a hard handoff while valve actuation components for other cylinders experience might experience a "softer" handoff.

In a typical engine valve actuation system configured for engine braking, the timing at which engine braking is initiated is generally determined by when an operator or a supervisory controller commands initiation of engine braking, not consideration of the present states of valve actuation components for any given cylinder. Over the course of many cycles of turning on and turning off engine braking, valve actuation components for some cylinders can experience more hard handoffs than others, by random chance, and thus experience premature wear, performance degradation, or failure. The present disclosure contemplates distributing softer handoffs among the engine braking rocker arms and other valve actuation components of the respective cylinders, typically in an ordered sequence, to better normalize occurrence of wear or other undesired phenomenon amongst components in valve actuation system 28.

Figure 3:
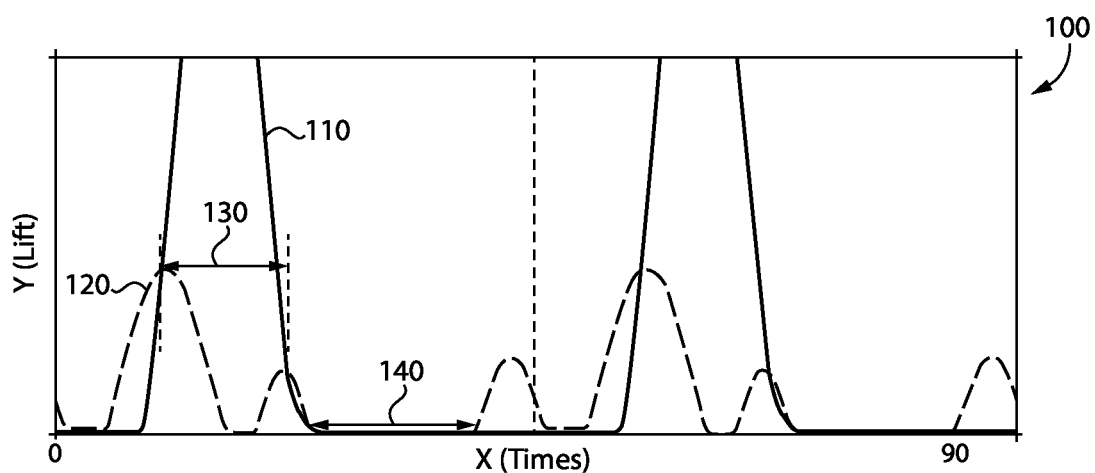
FIG. 3 is a graph of valve lift/rocker arm timings in an engine system, according to one embodiment.

Referring also now to FIG. 3, there is shown a graph 100 including an exhaust valve lift trace 110 and an engine braking lift trace 120. Trace 110 corresponds to an exhaust valve position and an exhaust valve rocker arm position that might be observed, over approximately two engine cycles in FIG. 3, when an engine system is operating in a normal, four-cycle mode. Trace 120 shows an exhaust valve position and engine braking rocker arm position that might be observed in an engine braking mode. It will be understood that during the normal mode the exhaust valve is actuated fully open at or close to the beginning of a fourth (exhaust) stroke of a piston in an engine cycle, then closed at or close to the end of the fourth stroke, and is maintained closed during intake, compression, and expansion strokes. During the engine braking mode the exhaust valve may be opened prior to the fourth stroke of the piston, then closed, then opened again and closed again during the fourth stroke, to effectuate multiple compression-release engine braking events in each engine cycle. The illustration in FIG. 3 is exemplary only and various alternatives or modifications to this general engine braking strategy might be implemented.

A first timing window 130 is shown between timings where trace 120 intersects trace 110. Timing window 130 can be understood in this example to occur approximately between a first time where a cam lobe for an exhaust valve rocker arm is ascending and a first cam lobe for an engine braking rocker arm is approximately at peak lift, or just prior to peak lift, and a second time where the cam lobe for the exhaust valve rocker arm is descending and a second cam lobe for the engine braking rocker arm is approximately at peak lift, or just after peak lift. Turning on or turning off engine braking during timing window 130 can result in a hard handoff as discussed herein. Timing window 130 may thus be understood as a hard handoff switching window.

Another switching window is shown at 140 where a hard handoff for the respective cylinder will not tend to occur. The cam phasing timing for the subject cylinder may be a base circle timing during switching window 140. Thus, during switching window 140 neither the exhaust valve rocker arm nor the engine braking rocker arm is acting to open or close the associated exhaust valve. This presents an opportunity to turn on or turn off engine braking without resulting in a hard handoff to or from the engine braking rocker arm associated with the subject cylinder. Each time engine braking is turned off or turned on, by varying the switching window timing at which engine braking is turned off or turned on engine braking control unit 50 can control which valve actuation components are at what switching window.

In the illustrated embodiment, switching window 140 represents an optimum switching window timing. Among the plurality of engine braking rocker arms 34, an optimum switching window timing may be unique to each engine braking rocker arm 34. Thus, any time engine braking is turned on or turned off, the selected switching window timing for performing the turning on or turning off of engine braking may be an optimum switching window timing that is one of a plurality of different optimum switching window timings each for a different one of the plurality of engine braking rocker arms 34. It will thus further be appreciated that a plurality of optimum switching window timings may occur during base circle timings of a plurality of different cams for the plurality of different engine braking rocker arms 34.

Electrohydraulic control system 42 further includes an engine timing sensor 52. Engine timing sensor 52 can be coupled with crankshaft 20, with camshaft 30, or with another part of engine system 10 having a known or determinable relationship to engine crank angle. Engine braking control unit 50 is in communication with engine timing sensor 50, and in control communication with valve 46. Engine braking control unit 50 is structured to receive an engine timing signal from engine timing sensor 52 indicative of a switching window timing for one of the plurality of engine braking rocker arms 34. The engine timing signal is indicative of a switching window timing as the engine timing signal may indicate a present engine crank angle. Since a switching window for each engine braking rocker arm 34 may include a finite range of crank angle, by monitoring present crank angle engine braking control unit 50 can precisely control turning on or turning off engine braking to occur during any desired switching window timing. A desired switching window timing could be a cam base circle timing, generally an optimum switching window timing, as shown in FIG. 3, or another switching window timing. What is or is not an optimum switching window timing may vary depending upon valve actuation system design, such as the profiles of cams that are used.

Engine braking control unit 50 is further structured to command adjusting valve 46 between its first position and its second position based on the engine timing signal, and to adjust hydraulically actuated switches 36 in each of engine braking rocker arms 34 simultaneously between the on state and the off state at the switching window timing based on the commanded adjustment to valve 46. Another way to understand the logic is that engine braking control unit 50 monitors engine crank angle and varies the timing at which engine braking is turned on and/or turned off via varying the timings of a plurality of commanded adjustments to valve 46 over time to distribute a desired, typically optimum, switching window among the cylinders.

In this way, engine braking control unit 50 will typically cycle through the cylinders in an ordered sequence of the switching window timings, so that all cylinders receive an equal or approximately equal number of hard handoffs over time. For example, engine braking control unit 50 could adjust valve 46 to turn on engine braking at the optimum switching window timing for cylinder 1, then adjust valve 46 to turn off engine braking at the optimum switching window timing for cylinder 2. In another example, engine braking control unit 50 could adjust valve 46 to turn on engine braking at the optimum switching window timing for cylinder 1, then turn off engine braking at the optimum switching window timing for cylinder 1, and subsequently turn on engine braking at the optimum switching window timing for cylinder 2, then turn off engine braking at the optimum switching window timing for cylinder 2, and so on.

Analogously, engine braking control unit 50 can be understood to be assigning an optimum switching window timing to one cylinder, then to another, then to another, and so on. Engine braking control unit 50 may thus further be understood as structured to command adjusting electrically actuated valve 46 to simultaneously adjust hydraulically actuated switches 36 at each of the plurality of different optimum switching window timings in an ordered sequence. In so doing, engine braking control unit 50 may vary a timing of a plurality of commanded adjustments to valve 46, such that switches 36 are simultaneously adjusted between the on state and the off state at a plurality of different switching window timings to distribute hard handoffs among the plurality of engine braking rocker arms 34. Other ordered sequences of assigning optimum switching window timings will be readily envisioned by those skilled in the art. In some embodiments, assignment of hard handoff or other non-optimum switching window timings could alternatively be used.

Figure 4:
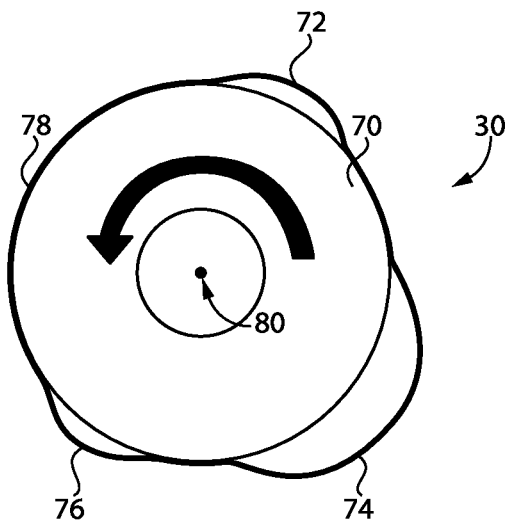
FIG. 4 is a diagrammatic view of a cam profile, according to one embodiment.

Referring also to FIG. 4, there is shown a cam 70 suitable for use in actuating one of engine braking rocker arms 34 and rotatable about a camshaft axis 80. Cam 70 includes a first cam lobe 72, a second cam lobe 74, a third cam lobe 76, and a base circle 78. With reference back to FIG. 3, switching window timing 140 can include a base circle timing of cam 70, in other words a cam phasing where a cam follower of the associated engine braking rocker arm is in contact with cam 70 upon the base circle. In this example, each optimum switching window timing will be understood to occur once per every two crank revolutions or once per 720° degrees of engine crank angle. In a typical scenario, engine braking might be turned on or turned off during the base circle timing of a first cam for a first one of engine braking rocker arms 34. When engine braking is turned on or off again it may occur during the base circle timing of a cam for a second one of engine braking rocker arms 34, then a base circle timing for a cam of a third one of engine braking rocker arms 34, and so on. It will thus be appreciated engine braking control unit 50 is structured to command adjusting valve 46 to vary a pressure of actuation fluid supplied from supply 44 to each of switches 36 simultaneously at each one of a plurality of different, out of phase switching window timings.

It will also be recalled that exhaust valve rocker arms 38 may also be controlled by valve 46. Thus, each time engine braking is turned on or turned off valve 46 is adjusted once to switch all of engine braking rocker arms 34 and all of exhaust valve rocker arms 38 on or off simultaneously, but at each change the switching window timing may be different. As discussed above, the hard handoffs could be distributed using other strategies, such as by giving the optimum switching window to cylinder 1 "X" number of times, then to cylinder 4 "X" number of times, then to cylinder 2 "X" number of times, etc.

INDUSTRIAL APPLICABILITY

Figure 5:
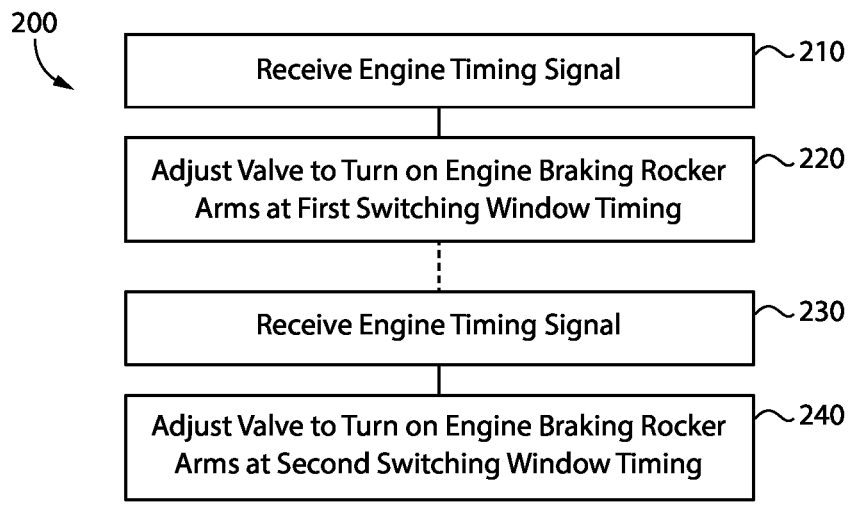
FIG. 5 is a flowchart illustrating example methodology and logic flow, according to one embodiment.

Referring also now to FIG. 5, there is shown a flowchart 200 illustrating example methodology and logic flow for operating engine valve actuation system 28. At a block 210 an engine timing signal is received that is indicative of a switching window timing for one of engine braking rocker arms 34. The switching window timing may be an optimum switching window timing, such as a cam base circle timing as discussed herein. In a typical implementation the switching window timing is optimum for only one of engine braking rocker arms 34, and not optimum for any of the other engine braking rocker arms 34. Put differently, the one of the engine braking rocker arms 34 and the associated valve actuation components will typically not experience a hard handoff and instead experience a softer handoff. One or more of the other engine braking rocker arms 34 and associated valve actuation components may receive a hard handoff.

From block 210 flowchart 200 advances to a block 220 to adjust valve 46 from its first position to its second position to simultaneously turn on all of engine braking rocker arms 34 at a first switching window timing. From block 210 flowchart 200 advances to a block 230 to again receive an engine timing signal. Between block 220 and block 230 valve 46 may be adjusted to turn off engine braking rocker arms 34. From block 230 flowchart 200 advances to a block 240 to adjust valve 46 to turn on engine braking rocker arms 34 at a second switching window timing different from the first switching window timing. Thus, at block 240 all of engine braking rocker arms 34 will be simultaneously turned on again at a switching window timing for another, different one of engine braking rocker arms 34. Subsequently, engine braking rocker arms 34 can again be turned off.

In view of the present description, it will be appreciated that the next time engine braking rocker arms 34 are turned on they will be turned on at a third switching window timing, typically until the chosen switching windows have been varied to cycle through optimum switching window timings associated with each cylinder 16. Thus, engine braking rocker arms 34 may be simultaneously turned on a plurality of times in an ordered sequence of different switching window timings. Thereafter the cycle can repeat through subsequent engine braking events.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine valve actuation system for an engine, the system comprising:
  a plurality of engine braking rocker arms, each engine braking rocker arm including:
    a hydraulically actuated switch configured to alternately turned on and turned off, and
    a unique optimum switching window timing;
  an electrohydraulic control system including:
    an actuation fluid supply configured to supply actuation fluid to each hydraulically actuated switch, and an electrically actuated valve configured to vary a pressure of the actuation fluid supplied to each hydraulically actuated switch; and an engine braking control unit configured to:
receive an engine braking switching command each time an engine braking mode is turned on and each time the engine braking mode is turned off,
receive a first engine timing signal indicative of the optimum switching window timing of a first engine braking rocker arm of the plurality of engine braking rocker arms when a first engine braking switching command is received, and
adjust the electrically actuated valve such that each hydraulically actuated switch is simultaneously turned off or simultaneously turned on based on the first engine timing signal.

2. The system of claim 1 wherein each optimum switching window timing occurs once per 720° of engine crank angle.

3. The system of claim 1 further comprising a plurality of cams respectively associated with the plurality of engine braking rocker arms,
wherein the optimum switching window timing of each engine braking rocker arm corresponds to a base circle timing of the associated cam.

4. The system of claim 1 wherein each time the engine braking control unit receives a subsequent engine braking switching command, the engine braking control unit is further configured to:
receive an updated engine timing signal corresponding to the optimum switching window timing of a different engine braking rocker arm of the plurality of engine braking rocker arms so as to cycle through each unique optimum switching widow timing, corresponding to the updated engine timing signal, in an ordered sequence, and
adjust the electrically actuated valve such that each hydraulically actuated switch is simultaneously turned off or simultaneously turned on based on the updated engine timing signal.

5. The system of claim 1 further comprising a plurality of exhaust valve rocker arms, each exhaust valve rocker arm including a hydraulically actuated switch configured to be alternately turned on and turned off.

6. The system of claim 5 wherein the actuation fluid supply is further configured to supply the actuation fluid to each hydraulically actuated switch of the plurality of exhaust valve rocker arms, and
wherein the electrically actuated valve is further configured to vary a pressure of the actuation fluid supplied to each hydraulically actuated switch of the plurality of exhaust valve rocker arms.

7. A method of operating an engine valve actuation system for an engine including a plurality of engine braking rocker arms and a plurality of exhaust valve rocker arms, the method comprising:
receiving an engine braking activation command indicative of an engine braking mode being turned on;
receiving a first engine timing signal indicative of an optimum switching window timing of a first engine braking rocker arm of the plurality of engine braking rocker arms based on the engine braking activation command;
turning off each exhaust valve rocker arm at the optimum switching window timing of the first engine braking rocker arm;
adjusting an electrically actuated valve so as to vary a pressure of actuation fluid supplied to a hydraulically actuated switch arranged in each engine braking rocker arm based on the first engine timing signal; and
turning on each engine braking rocker arm at the optimum switching window timing of the first engine braking rocker arm via the adjusting of the electrically actuated valve.

8. The method of claim 7 wherein each engine braking rocker arm includes a unique optimum switching window timing, and
wherein each time a subsequent engine braking activation command is received, the method further comprises:
receiving an updated engine timing signal corresponding to an optimum switching window timing of a different engine braking rocker arm of the plurality of engine braking rocker arms so as to cycle through each unique optimum switching widow timing, corresponding to the the updated engine timing signal, in an ordered sequence, and
turning on each engine braking rocker arm based on the updated engine timing signal via the electrically actuated valve.

9. The method of claim 8 wherein the turning on of each engine braking rocker arm is performed simultaneously.

10. The method of claim 9 wherein the simultaneously turning on of each engine braking rocker arm causes at least one engine braking rocker arm of the plurality of engine braking rocker arms to experience a hard handoff in which the at least one engine braking rocker arm is turned on outside of a respective optimum switching window timing, and
wherein each time a subsequent engine braking activation command is received, at least one different engine braking rocker arm of the plurality of engine braking rocker arms experiences the hard handoff such that each engine braking rocker arm experiences the hard handoff in an ordered sequence based on the updated engine timing signal.

11. The method of claim 7 wherein each engine braking rocker arm includes an associated cam, and
wherein the optimum switching window timing of the first engine braking rocker arm corresponds to a cam phasing timing between cam lobes on the associated cam of the first engine braking rocker arm.

12. The method of claim 11 wherein the optimum switching window timing of the first engine braking rocker arm further corresponds to a base circle timing of the associated cam of the first engine braking rocker arm.

13. The method of claim 7 wherein the turning off of each exhaust valve rocker arm and the turning on of each engine braking rocker arm at the optimum switching window timing of the first engine braking rocker arm are performed simultaneously via the adjusting of the electrically actuated valve.

14. A control system for engine braking in an engine system including a plurality of exhaust valve rocker arms, a plurality of engine braking rocker arms each including a hydraulically actuated switch and a unique optimum switching window timing, and an electrically actuated valve configured to vary a pressure of actuation fluid supplied to each hydraulically actuated switch, the control system comprising:
an engine braking control unit configured to:
receive an engine braking switching command each time an engine braking mode is turned on and each time the engine braking mode is turned off;
receive a first engine timing signal indicative of an optimum switching window timing of a first engine braking rocker arm of the plurality of engine braking rocker arms when a first engine braking switching command is received;

adjust the electrically actuated valve so as to simultaneously adjust each hydraulically actuated switch from an on state to an off state or from the off state to the on state based on the first engine timing signal;

receive an updated engine timing signal corresponding to the optimum switching window timing of a different engine braking rocker arm of the plurality of engine braking rocker arms each time a subsequent engine braking switching command is received so as to cycle through each unique optimum switching widow timing, corresponding to the respective updated engine timing signal, in an ordered sequence; and adjust the electrically actuated valve so as to simultaneously adjust each hydraulically actuated switch from the on state to the off state or from the off state to the on state based on the updated engine timing signal, wherein the simultaneously adjusting of each hydraulically actuated switch causes at least one engine braking rocker arm of the plurality of engine braking rocker arms to experience a hard handoff in which the hydraulically actuated switch of the at least one engine braking rocker arm is adjusted at a timing outside of the optimum switching window timing of the at least one engine braking rocker arm, and wherein each time a subsequent engine braking switching command is received, at least one different engine braking rocker arm of the plurality of engine braking rocker arms experiences the hard handoff such that each engine braking rocker arm experiences the hard handoff in an ordered sequence based on the updated engine timing signal.

15. The control system of claim 14 wherein each engine braking rocker arm further includes an associated cam, and wherein the optimum switching window timing of each engine braking rocker arm corresponds to a cam phasing timing between cam lobes on the associated cam.

16. The control system of claim 15 wherein the cam phasing timing of at least one of the associated cams corresponds to a base circle timing.

* * * * *